United States Patent [19]

Senatore et al.

[11] 4,414,340

[45] Nov. 8, 1983

[54] THERMOSETTING COMPOSITIONS

[75] Inventors: Guy Senatore; Ralph C. Farrar, both of Bartlesville, Okla.

[73] Assignee: Phillips Petroleum Company, Bartlesville, Okla.

[21] Appl. No.: 466,691

[22] Filed: Feb. 15, 1983

[51] Int. Cl.$^3$ .............................. C08K 3/40; C08K 3/22
[52] U.S. Cl. ............................ 523/219; 523/200; 523/203; 523/212; 523/214; 524/394; 524/399; 524/400; 524/424; 524/425; 524/426; 524/437; 524/444; 524/445; 524/449; 524/451; 524/525
[58] Field of Search ............... 523/200, 203, 212, 214, 523/219; 524/394, 399, 400, 424, 425, 426, 437, 444, 445, 449, 451, 525

[56] References Cited

U.S. PATENT DOCUMENTS

| | | | |
|---|---|---|---|
| 3,135,716 | 6/1964 | Uraneck et al. | 525/122 |
| 3,177,190 | 4/1965 | Hsieh | 525/340 |
| 3,225,089 | 12/1965 | Short | 562/551 |
| 3,227,701 | 1/1966 | Pennington | 525/355 |
| 3,242,129 | 3/1966 | Wilder | 524/483 |
| 4,020,036 | 4/1977 | South, Jr. | 523/514 |
| 4,104,210 | 8/1978 | Coran et al. | 525/203 |
| 4,111,898 | 9/1978 | Inayoshi et al. | 524/529 |
| 4,117,036 | 9/1978 | Honda et al. | 524/13 |
| 4,158,654 | 6/1979 | Moczygemba et al. | 523/514 |
| 4,242,415 | 12/1980 | Feltzin et al. | 428/414 |
| 4,371,635 | 2/1983 | Senatore | 523/219 |

Primary Examiner—Melvyn I. Marquis
Assistant Examiner—Herbert J. Lilling

[57] ABSTRACT

A thermosetting composition exhibiting improved physical properties and little or no blistering is provided consisting essentially of a $CO_2$ or $O_2$ terminated high vinyl alkadiene polymer, an inorganic filler, an organic peroxide compound, and a polyolefin modifier.

17 Claims, No Drawings

THERMOSETTING COMPOSITIONS

This invention relates to a thermosetting composition exhibiting superior physical properties as well as reduced blistering.

Various compositions useful for thermosetting molding have been described in the art. Typical, for example, is U.S. Pat. No. 3,821,158 which teaches the preparation of thermosetting compositions comprising a high vinyl butadiene polymer, polyethylene, an inorganic filler, and a free radical initiator.

To be commercially valuable, thermosetting molding compositions must have good impact resistance, hardness, shrinkage resistance, and both flexural and tensile strength. Furthermore, the physical appearance of thermosetting compositions is important to their commercial value. Such compositions which exhibit blistering or bubbling are highly undesirable. Not only do they detract from the appearance of the composition but they also represent a point of weakness since they typically propagate cracks upon impact.

While the prior art has provided thermosetting compositions with adequate physical properties and reduced blistering, ongoing research is still being conducted to find thermosetting compositions which exhibit both excellent physical properties and little or no blistering. It is therefore an object of this invention to provide a thermosetting composition exhibiting little or no blistering and excellent physical properties.

Other aspects, objects, and the several advantages of the present invention will become apparent from a reading of this specification and the claims.

Specifically, in accordance with the present invention there is provided an improved thermosetting composition consisting essentially of (a) a $O_2$ or $CO_2$ terminated high vinyl alkadiene polymer, said alkadiene having 4–8 carbon atoms per molecule with the polymer having at least 50 percent content of 1,2 bonded vinyl units, (b) an organic peroxide compound; (c) a polyolefin modifier; and (d) an inorganic filler selected from the group consisting of Group IIA metal carbonates, talc, mica, clay, wollastonite, aluminum trihydrate, and solid or hollow glass beads. This thermosetting composition exhibits reduced blistering as well as enhanced physical properties such as impact resistance and tensile strength.

The alkadiene polymers used in preparing the thermosetting compositions of this invention can be homopolymers of conjugated alkadienes containing 4–8 carbon atoms such as 1,3-butadiene, isoprene, 2-ethyl-1,3-butadiene, 1,3-pentadiene, and mixtures thereof. Also linear or radially branched copolymers of conjugated alkadienes containing 4–8 carbon atoms with vinyl arene comonomers containing 8–20 carbon atoms, such as styrene, alpha-methylstyrene, 3,5-diethylstyrene, 4-n-propylstyrene, 4-cyclohexylstyrene, 4-phenylstyrene, 3-benzylstyrene, 2,4,6-trimethylstyrene, 1-vinylnaphthalene, 8-phenyl-1-vinyl-napthalene and mixtures thereof can be employed.

The presently preferred alkadiene polymer is a linear homopolymer of 1,3-butadiene.

The above-cited alkadiene homo- and copolymers suitable for this invention have a number average molecular weight ($M_n$) ranging from about 500 to about 500,000, more preferably from 1,000 to 50,000. The vinyl content, i.e., the proportion of alkadiene units bonded together in the 1,2-mode of addition, thus forming vinyl pendant groups, preferably ranges from about 50 percent to about 100 percent, more preferably from about 60 percent to 100 percent (as quantitatively determined by infrared absorption spectroscopy at 11.0 micron, using a solution of approximately 2.5 grams of polymer in 100 milliliters of anhydrous carbon disulfide).

The alkadiene polymers used in the process of the present invention are terminated with either $O_2$ or $CO_2$ or mixtures thereof. In the present invention, a $O_2$ or $CO_2$ terminated alkadiene polymer is defined to be one wherein at least 10%, and preferably 25%, of the metallic cations such as $Li^+$ or $Na^+$, introduced by polymerization initiators such as n-butyl lithium, are removed from the live polymer by the addition of $O_2$ or $CO_2$ and subsequently polymer growth is terminated. In the present invention, gases will be used containing either $O_2$ and $CO_2$ or both.

The thermosetting compositions of this invention include an organic peroxide compound as a curing or crosslinking agent for the alkadiene polymer segments. Suitable organic peroxide compounds include diacyl peroxides, ketone peroxides, peroxydicarbonates, peroxyesters, dialkyl peroxides, hydroperoxides, and peroxyketals, preferably containing up to about 30 carbon atoms per molecule. Exemplary organic peroxy compounds include
alpha,alpha'-bis(tert-butylperoxy)diisopropylbenzene;
2,5-dimethyl-2,5-bis(tert-butylperoxy)hexane,
2,5-dimethyl-2,5-bis(tert-butyl peroxy)hexyne,
n-butyl-4,4-bis(tert-butylperoxy)valerate;
1,1-di(tert-butylperoxy)-3,3,5-trimethylcyclohexane,
and admixtures thereof. These organic peroxides are effective in crosslinking the composition when the composition is heated beyond the activation temperature, i.e., the decomposition temperature, of said peroxides. Alpha,alpha'-bis(tert-butyl peroxy)diisopropylbenzene is most preferred.

Inorganic fillers are included in the composition of this invention to enhance various properties of the moldings such as flexural modulus, strength, hardness, corrosion resistance, electrical properties, flame retardancy and flow, and to lower or reduce less desirable properties such as warpage, shrinkage and composition cost. Examples of suitable fillers are Group IIA metal carbonates, preferably calcium carbonate, talc, mica, clay, wollastonite, aluminum trihydrate and solid or hollow glass beads.

The polyolefins employed in the composition of this invention as shrink control agents have a molecular weight in the range of about 1,000 to 50,000. Examples of such modifiers are atactic polypropylene, polyethylene, polypropylene, polyisobutylene, polybutylene, ethylene-propylene copolymers, ethylene-butylene copolymers, ethylene-isobutylene copolymers, propylene-butylene copolymers and propylene-isobutylene copolymers, preferably atactic polypropylene and isobutylene.

The composition of this invention preferably contains an internal mold release agent to facilitate the removal of the cured composition from the mold. The materials commonly employed for this purpose are metal salts of long chain $C_{10}$ to $C_{20}$ fatty acids such as zinc stearate and calcium stearate.

Additionally, the composition may contain a coupling agent to enhance the properties of molded articles by promoting bonding and adhesion of the polymer to the filler and/or glass fiber reinforcement. The organic silanes and titanates which can be employed as coupling agents in accordance with the present invention include vinyltriethoxysilane, gamma-methacryloxypropyltrimethoxysilane, isopropyl trimethacryl titanate, isopropyl dimethacryl titanate, and the like, and mixtures thereof.

The composition of this invention optionally contains cross-linkable plasticizers such as the trimethyacrylate of trimethylolpropane, pentaerythritol acrylate, or other high boiling, low volatility, liquid hydrocarbons containing double bonds, which reduce viscosity during compounding but crosslink during curing. These cross-linkable plasticizers have the added advantage that they will not be lost by evaporation; thus, the compositions need not be stored in an air tight or sealed container. Although it is possible to use said plasticizers in compositions containing a liquid monomer, it is presently preferred to use said plasticizers or liquid monomers separately. It is presently preferred to use cross-linkable plasticizers, comprising polymethacrylates of polyglycols, to minimize viscosity while mixing compositions containing little or no liquid monomer.

The most preferred thermosetting compositions of this invention, having improved physical properties, and no or little blistering, will vary depending on the methods of compounding and their end uses but will generally be within the ranges of ingredients stated in the following table:

TABLE I

| Ingredients | Generally Employed Parts by Weight | Preferably Employed Parts by Weight |
|---|---|---|
| High vinyl alkadiene polymer | 100 | 100 |
| Cross-linkable plasticizer | 0-10 | 0-6 |
| Inorganic Filler | 50-1,000 | 300-600 |
| Mold release agent | 0-10 | 2-4 |
| Coupling agent | 0-5 | 0-2 |
| Organic peroxide compound | 2-10 | 4-6 |
| Polyolefin modifier | 5-90 | 5-60 |
| Glass Fiber Reinforcing Agent | 0-300 | 80-180 |

The ingredients of the thermosetting compositions of our invention can be mixed by any suitable mixing means such as a Brabender Plasticorder at a relatively low speed for a time sufficient to accomplish complete mixing and wetting of fillers and reinforcing fibers. Preferably the filler is added in two increments at a speed of about 100 r.p.m., whereas the fibers are added thereafter at a much lower speed, e.g., 20 r.p.m., until fully "wet out".

The thermosetting compositions of this invention are molded at an elevated temperature of about 150°-200° C. and a pressure of about 800-1500 psi for about 2-10 minutes, and preferably a temperature of about 180° C., a pressure of about 1100 psi, for about 5 minutes.

The following examples further illustrate the present invention.

EXAMPLE I

In this example the general procedure for preparing high-vinyl polybutadiene, terminated with various agents, is described. A jacketed, stirred reactor was charged with variable amounts of cyclohexane, tetrahydrofuran (THF; used as randomizer), 1,4-butadiene and, finally, n-butyllithium (NBL; used as initiator). The reactor was stirred for about 30-45 minutes at about 30° C. Thereafter variable amounts of a terminating agent (2-propanol, ethylene oxide and propylene oxide in control runs; $O_2$ (air) and $CO_2$ in invention runs) were introduced so as to stop the polymerization reaction.

The terminated reaction mixture was then blown into a dry flask containing about 200 milliliters of cyclohexane, about 2 milliliters of isopropanol and a small amount of an antioxidant (usually BHT = 2,6-di-t-butyl-p-cresol). The polymer solution was finally desolventized by heating it in a rotating, titled film evaporator flask.

Polymerization conditions for preparing high-vinyl butadiene polymers terminated with different agents and pertinent polymer properties are summarized in Table II.

TABLE II

| Polymer | 1 (Control) | 2 (Control) | 3 (Control) | 4 (Invention) | 5 (Invention) | 6 (Invention) | 7 (Invention) |
|---|---|---|---|---|---|---|---|
| A. Polymerization: | | | | | | | |
| Amount of Butadiene, grams | 100 | 100 | 100 | 100 | 100 | 100 | 100 |
| Amount of Cyclohexane, grams | 760 | 760 | 760 | 760 | 760 | 760 | 760 |
| Amount of Tetrahydrofuran, grams | 10 | 10 | 10 | 10 | 10 | 10 | 10 |
| Amount of n-Butyllithium, mhm[1] | 5.5 | 5.5 | 5.5 | 5.5 | 5.5 | 5.5 | 5.5 |
| Temperature, °C. | 30 | 30 | 30 | 30 | 30 | 30 | 30 |
| Polymerization Time, Minutes | 30 | 30 | 30 | 30 | 30 | 30 | 30 |
| B. Termination: | | | | | | | |
| Terminating Agent | 2-Propanol | Ethylene Oxide | Propylene Oxide | Air | Air | $CO_2$ | $CO_2$ |
| Amount of Terminating Agent, cc | Excess | 250 | Excess | 700 | 175 | 32 | 16 |
| Maximum Termination Temperature, °C. | 31.5 | — | 31.0 | 32.5 | — | 31.5 | — |
| C. Polymer Properties | | | | | | | |
| Weight Average Molecular Weight (Mw)[2] | 17,800 | 26,100 | 23,300 | 29,500 | 28,800 | 37,000 | 31,000 |
| Number Average Molecular Weight (Mn)[2] | 17,400 | 24,600 | 22,800 | 26,000 | 25,900 | 27,000 | 25,900 |
| % Trans[3] | 12.4 | 10.2 | 12.5 | 10.2 | 10.4 | 12.6 | 10.5 |
| % Vinyl[4] | 74.6 | 74.9 | 70.9 | 70.8 | 76.0 | 69.4 | 74.2 |
| Inherent Viscosity[5] | 0.39 | 0.37 | 0.33 | 0.40 | 0.38 | 0.42 | 0.38 |

[1] gram-millimoles per 100 grams of monomer;
[2] determined by gel permeation chromatography in accordance with the procedure described by G. Kraus and C. Stacy, J. Poly. Sci. A-2 10, 657 (1972) and J. Poly. Sci. Symposium No. 43,329 (1973);
[3] determined by IR absorption at a wavelength of 10.35 microns, employing a Perkin-Elmer 283 B IR spectrophotometer and using a solution of approximately 2.5 grams of polymer in 100 milliliters of anhydrous carbon disulfide;
[4] same as procedure as in [3] except that the wavelength is 11.0 microns;
[5] determined according to the procedure given in U.S. Pat. No. 3,278,508, column 20, Note a with the modification that the solution was filtered through a glass filter stick of grade C porosity and pressured directly into the viscometer.

EXAMPLE II

In this example the compounding of the high-vinyl butadiene homopolymers of Example I to form bulk molding compounds, conditions for molding them, and pertinent physical properties of these compounds after molding are described.

Compounding was carried out using a CW Brabender Plasticorder fitted with an unheated sigma-bladed mixing head. The high-vinyl polybutadiene, polymeric modifiers, and approximately 50% of the filler ($CaCO_3$) were added initially, followed by the other additives. After 1-2 minutes, at a mixer speed of about 100 r.p.m., the remainder of the filler was added, and mixing was continued for about 5 minutes. The mixer speed was then reduced to about 10 r.p.m., and the glass fiber reinforcement was added. Mixing was continued only long enough (usually about 3 minutes) to wet out and disperse the glass fibers. Extended mixing at this stage caused attrition of the individual glass fibers and a resulting reduction in mechanical properties. Compounding recipes are summarized in Table III.

(runs 4 and 6) were higher than two control compounds (runs 1 and 3).

Reasonable variations and modifications are possible from the disclosure of the present invention without departing from the spirit and scope thereof.

We claim:

1. A thermosetting composition comprising:
   (a) 100 parts by weight of an $O_2$ or $CO_2$ terminated high vinyl alkadiene polymer, said alkadiene having 4-8 carbon atoms per molecule with the polymer having at least 50 percent content of 1,2 bonded vinyl units;
   (b) 2-10 parts by weight of organic peroxide compound;
   (c) 5-90 parts by weight polyolefin modifier; and (d) 50-1,000 parts by weight of inorganic filler selected from the group consisting of Group IIA

TABLE III

| Compound | 1 (Control) | 2 (Control) | 3 (Control) | 4 (Invention) | 5 (Invention) | 6 (Invention) | 7 (Invention) |
|---|---|---|---|---|---|---|---|
| Type of High-Vinyl Polybutadiene[1] | Polymer 1 | Polymer 2 | Polymer 3 | Polymer 4 | Polymer 5 | Polymer 6 | Polymer 7 |
| Amount of High-Vinyl Polybutadiene, g | 100 | 100 | 100 | 100 | 100 | 100 | 100 |
| Amount of Atactic Polypropylene[2], g | 29 | 29 | 29 | 29 | 29 | 29 | 29 |
| Amount of Polyisobutylene[3], g | 14 | 14 | 14 | 14 | 14 | 14 | 14 |
| Amount of Calcium carbonate[4], g | 571 | 571 | 571 | 571 | 571 | 571 | 571 |
| Amount of Zinc Stearate[5], g | 2.9 | 2.9 | 2.9 | 2.9 | 2.9 | 2.9 | 2.9 |
| Amount of Coupling Agent[6], ml | 0.7 | 0.7 | 0.7 | 0.7 | 0.7 | 0.7 | 0.7 |
| Amount of crosslinkable Plasticizer[7], ml | 7.1 | 7.1 | 7.1 | 7.1 | 7.1 | 7.1 | 7.1 |
| Amount of Peroxide[8], g | 5.7 | 5.7 | 5.7 | 5.7 | 5.7 | 5.7 | 5.7 |
| Amount of Fiberglass[9], g | 129 | 129 | 129 | 129 | 129 | 129 | 129 |

[1]Polymers described in Table II of Example I;
[2]Polytac R500, a shinkage control agent having a number average molecular weight of about 3700; Ring & Ball Softening point of 290-310° F.; marketed by Crowley Chemical Company, 201 Madison Ave., N.Y., N.Y.
[3]Vistanex LM-MH, a shrinkage control agent having a Staudinger molecular weight of about 11,000-12,000 marketed by Exxon Chemical Americas, Houston, Texas
[4]Gamma-Sperse® 6451, a ground filler having an average particle size of 5 microns, marketed by Georgia Marble Co.;
[5]Synpro ABG, an internal mold release agent marketed by Synthetic Products Company, a division of Dart & Kraft, Inc., Northbrook; Il.;
[6]Silane A 174; γ-methacryloxypropyltrimethoxysilane; marketed by Union Carbide Corporation, Danbury, Connecticut;
[7]Saret® 515; trimethacrylate of trimethylol propane; marketed by Sartomer Company, a division of ARCO Chemical Company, Philadelphia, PA.;
[8]Vulcup® R; α,α'-bis[tert-butylperoxy]diisopropylbenzene; marketed by Hercules, Inc. Wilmington, Delaware;
[9]OCF 832 BC; a ¼ inch chopped glass fiber strand; marketed by Owens Corning Fiber Glass Corporation, Toledo, Ohio.;

Molding was done using a Pasadena press fitted with a 6 inch² polished positive pressure mold at about 177° C./1100 psi for 5 minutes. Test specimens, were prepared by sawing molded plaques into 6×½×⅛ inch strips. Pertinent physical properties of molded compounds are summarized in Table IV.

metal carbonates, talc, mica, clay, wollastonite, aluminum trihydrate, and solid or hollow glass beads.

2. A composition according to claim 1 further containing:
   (a) 0-10 parts by weight of mold release agents;

TABLE IV

| Compound[1] | 1 (Control) | 2 (Control) | 3 (Control) | 4 (Invention) | 5 (Invention) | 6 (Invention) | 7 (Invention) |
|---|---|---|---|---|---|---|---|
| Flexural Modulus[2], MPa | 4189 | — | 3922 | 8087 | — | 7036 | — |
| Flexural Strength[2], MPa | 36.9 | — | 31.0 | 75.2 | — | 46.3 | — |
| Tensile at Break[3], MPa | 15.8 | — | 18.1 | 30.0 | — | 23.1 | — |
| Notched Izod Impact[3], J/M | 191 | — | 168 | 160 | — | 158 | — |
| Barcol Hardness[4] | 0-12 | 0 | 0-10 | 21-30 | 10-15 | 20-25 | 0-15 |
| Shrinkage[5], mm/m | −0.4 | −0.4 | −0.3 | 0.3 | −0.4 | −0.1 | −0.6 |
| Surface Rating[6] | 5 | 5 | 5 | 1 | 2 | 1 | 2 |

[1]See Table III;
[2]determined according to ASTM D790;
[3]determined according to ASTM D256;
[4]determined according to ASTM D2583, using a GYZG 934-1 Barcol hardness tester manufactured by Barber-Coleman;
[5]determined after 24 hours by measuring the height of cold molded slab and the height of the cold metal mold; shrinkage is defined as the ratio of the height difference divided by the height of the cold mold;
[6]surface appearance visually rated on a scale of 1-5: 1 (no blisters), 2 (very few small blisters), 3 (few large blisters); 4 (many large blisters), 5 (completely covered with blisters).

Data in Table IV clearly show that molded compounds containing high-vinyl polybutadiene terminated with $O_2$ (air) or $CO_2$ exhibited no or very few surface blemishes (blisters), whereas the termination of the polybutadiene with an alcohol (isopropanol) or two epoxides (ethylene oxide or propanol oxide) resulted in severely blistered molded compounds. In addition, flexural and tensile properties of inventive compounds (b) 0-5 parts by weight of coupling agents;
   (c) 0-10 parts by weight of cross-linkable plasticizers; and
   (d) 0-300 parts by weight of glass fiber reinforcing agent.

3. A composition according to claim 1 wherein said high vinyl alkadiene polymer has an average molecular weight in the range of from about 1,000 to about 50,000.

4. A composition according to claim 3 wherein said vinyl alkadiene polymer consists essentially of 1,3-polybutadiene.

5. A composition according to claim 1 wherein said organic peroxide compound is at least one selected from the group consisting of alpha, alpha'-bis(tert-butylperoxy) diisopropylbenzene, 2,5-dimethyl-2,5-bis(tert-butylperoxy) hexane, and 2,5-dimethyl-2,5-bis(tert-butylperoxy) hexyne.

6. A composition according to claim 1 wherein said inorganic filler is selected from the group consisting of Group IIA metal carbonates, talc, mica, clay, wollastonite, aluminum trihydrate, and solid or hollow glass beads and mixtures thereof.

7. A composition according to claim 6 wherein said filler is a carbonate of a Group IIA metal.

8. A composition according to claim 7 wherein said Group IIA metal is calcium.

9. A composition according to claim 1 wherein said polyolefin modifier is at least one selected from the group consisting of atactic polypropylene, polyethylene, polypropylene, polyisobutylene, polybutylene, ethylene-propylene copolymers, ethylene-butylene copolymers, ethylene-isobutylene copolymers, propylene-butylene copolymers and propylene-isobutylene copolymers.

10. A composition according to claim 9 wherein said polyolefin modifier is one selected from the group consisting of atactic polypropylene and polyisobutylene.

11. A composition according to claim 2 wherein said mold release agent is selected from the group consisting of the metal salts of a $C_{10}$ to $C_{20}$ fatty acid.

12. A composition according to claim 11 wherein said mold release agent is one selected from the group consisting of the stearates of zinc, aluminum, barium, calcium, and magnesium.

13. A composition according to claim 12 wherein said mold release agent is zinc stearate.

14. A composition according to claim 2 wherein said coupling agent is at least one selected from the group consisting of organic silanes, and titanates.

15. A composition according to claim 14 wherein said coupling agent is gamma-methacryloxypropyltrimethoxysilane.

16. A composition according to claim 2 wherein said cross-linkable plasticizer is one selected from the group consisting of an ester of an acrylic acid, a substituted acrylic acid, and a polyfunctional alcohol.

17. A composition according to claim 16 wherein said cross-linkable plasticizer is trimethylacrylate of trimethylolpropane.

* * * * *